(12) United States Patent
Ostorero et al.

(10) Patent No.: US 9,587,653 B2
(45) Date of Patent: Mar. 7, 2017

(54) ACTUATING ASSEMBLY FOR MOVING AN OPERATIVE MEMBER OF A GLASSWARE FORMING MACHINE

(71) Applicant: BOTTERO S.p.A., Cuneo (IT)

(72) Inventors: Marcello Ostorero, Vignolo (IT); Luca Macagno, Peveragno (IT); Davide Scotto, Varazze (IT); Lorenzo Armando, Cuneo (IT); Fabio Basiglio, Mondovi' (IT)

(73) Assignee: BOTTERO S.P.A., Cuneo (IT)

( * ) Notice: Subject to any disclaimer, the term of this patent is extended or adjusted under 35 U.S.C. 154(b) by 276 days.

(21) Appl. No.: 14/558,245

(22) Filed: Dec. 2, 2014

(65) Prior Publication Data
US 2015/0152892 A1 Jun. 4, 2015

(30) Foreign Application Priority Data

Dec. 4, 2013 (IT) .............................. TO2013A0991

(51) Int. Cl.
| | |
|---|---|
| *F16J 1/10* | (2006.01) |
| *F15B 15/06* | (2006.01) |
| *C03B 9/16* | (2006.01) |
| *C03B 40/027* | (2006.01) |
| *C03B 7/14* | (2006.01) |
| *C03B 7/16* | (2006.01) |

(Continued)

(52) U.S. Cl.
CPC ................ *F15B 15/06* (2013.01); *C03B 7/14* (2013.01); *C03B 7/16* (2013.01); *C03B 9/165* (2013.01); *C03B 9/1932* (2013.01); *C03B 9/403* (2013.01); *C03B 40/027* (2013.01)

(58) Field of Classification Search
CPC .......... C03B 7/14; C03B 9/1932; F15B 15/06

USPC .......................................................... 92/129
See application file for complete search history.

(56) References Cited

U.S. PATENT DOCUMENTS

| | | | |
|---|---|---|---|
| 4,120,683 A | 10/1978 | Irwin | |
| 5,266,095 A * | 11/1993 | Futterknecht | ........... C03B 9/165 |
| | | | 65/234 |

FOREIGN PATENT DOCUMENTS

| | | |
|---|---|---|
| EP | 0915269 | 5/1999 |
| JP | H0967128 | 3/1997 |

OTHER PUBLICATIONS

Italian Search Report dated Jul. 28, 2013 corresponding to Italian Application No. TO2013A000991; 7 pages.

* cited by examiner

*Primary Examiner* — Thomas E Lazo
*Assistant Examiner* — Daniel Collins
(74) *Attorney, Agent, or Firm* — Ohlandt, Greeley, Ruggiero & Perle, LLP (57) ABSTRACT

In a glassware forming machine, an actuating assembly of an operative member has a tubular connecting body; a shaft for supporting the operative member coupled to the connecting frame to translate and rotate about a fixed axis thereof; a pneumatic jack for displacing the supporting shaft along the axis; a cam and tappet device for rotating the supporting shaft in opposite directions about the axis and having a chamber and a cam and tappet assembly housed in the chamber and lubricated by a lubricating liquid contained in the chamber; and a hydraulic device for stabilizing the motion of the shaft; the chamber and the hydraulic stabilizing device constituting part of a single closed hydraulic circuit for feeding a common lubricating and operative liquid to the cam and tappet device and to the hydraulic stabilizing device.

12 Claims, 5 Drawing Sheets

(51) Int. Cl.
*C03B 9/193* (2006.01)
*C03B 9/40* (2006.01)

ACTUATING ASSEMBLY FOR MOVING AN OPERATIVE MEMBER OF A GLASSWARE FORMING MACHINE

The present invention relates to an actuating assembly for moving an operative member of a glassware forming machine.

BACKGROUND OF THE INVENTION

Figure 1:
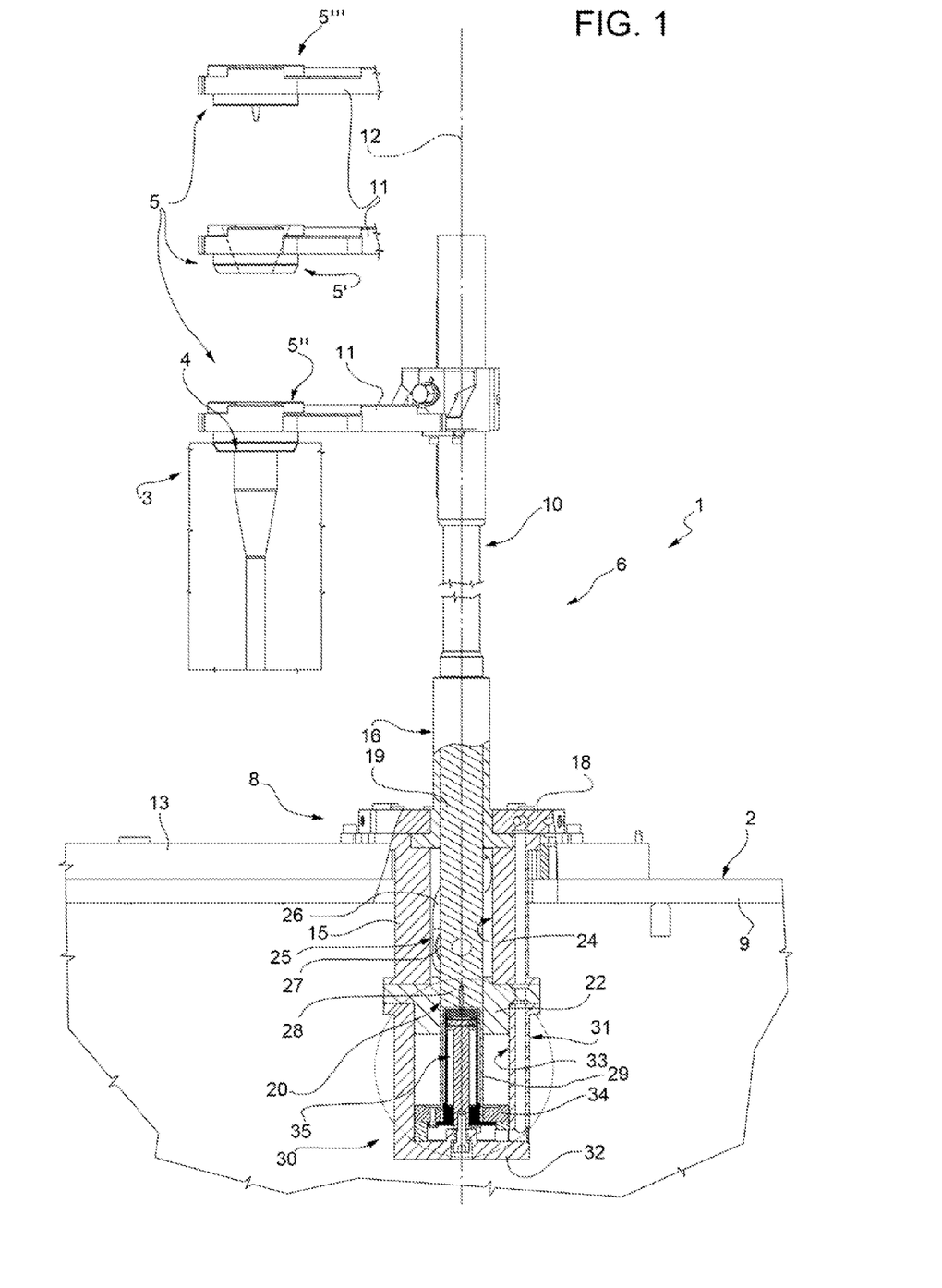
FIG. 1 shows a side elevation, partial section view of a preferred embodiment of the actuating assembly made according to the dictates of the present invention.
Figure 1A:
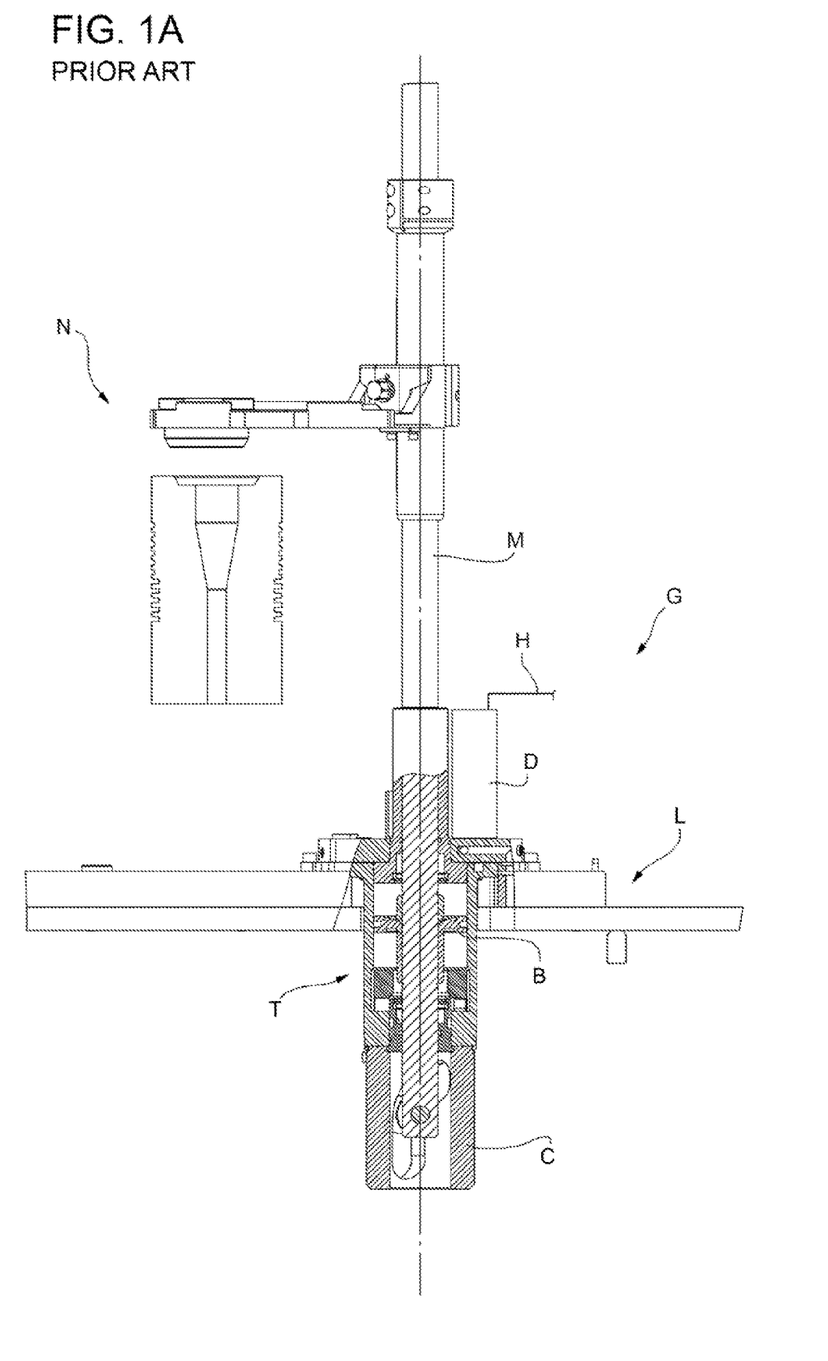
FIG. 1A is a prior art actuating assembly.

In particular, the present invention relates to an actuating assembly, for example of the type illustrated in FIG. 1A, for displacing a general operative member according with a roto-translation motion, and in the particular example described for displacing a funnel, or a baffle, or even a blowing head of a glassware forming I.S. machine, respectively to convey a gob of glass into a glassware forming mold, to close an upper inlet opening of the forming mold itself and to blow air into the inner cavity of the glassware being formed and make it assume the final shape.

The aforementioned roto-translation motion is obtained by combining a translation along a vertical axis to and from the forming mold and a rotation about the vertical axis itself from and to an operative position, in which the baffle, the funnel, or the blowing head are coupled to the forming mold.

Specifically, in FIG. 1A, reference G indicates a generic known actuating assembly, which extends through a box L of the machine and comprises a fixed frame T, a supporting shaft M of the operative member N coupled to the fixed frame coaxially to the vertical axis, a linear actuator B for translating the shaft along the vertical axis, a cam and tappet device C for rotating the shaft about the vertical axis itself arranged under the linear actuator B and a hydraulic damping cartridge D for braking the operative member when it is arranged near its raised end-of-stroke position along the vertical axis. The damping along the stretch near the lowered end-of-stroke position, on the other hand, is performed by controlling the pneumatic actuator and varying, for example, the compressed air exhaust passage section.

The hydraulic damping cartridge is arranged over, and in all cases near the linear actuator, and in some cases, like in the illustrated case, also near the box, and is connected to a dedicated hydraulic circuit H thereof external to the assembly.

On the other hand, the tappet and cam device is arranged under the linear actuator and comprises a fixed cam defined by a groove obtained in a side wall of a tubular body and a tappet element radially overhanging from a lower free end portion of the shaft and plunging into the tubular body.

The cam device is lubricated by the lubricating oil contained in a variable-volume chamber, and upper inlet of which is crossed by the mentioned end portion which is, in turn, coupled to the tubular body itself by the interposition of a seal surrounding the end portion itself.

Although universally used, the known actuator assemblies of the type described above are not very satisfactory both from the functional point of view and with regards to working environment safety.

This is consequent in part to the type of damping cartridges used, and specifically because they must be fed by a dedicated, external operative liquid circuit, the operative liquid notoriously having a high degree of flammability.

Although insulating heat barriers are provided, the external circuit is in all cases arranged in a high temperature environment by effect of the proximity with the molds, and consequently in a very dangerous environment in case of leakages or sudden failures which often generate fire aboard the machine.

This dangerousness is then accentuated if the cartridge is also arranged outside the box and closer to the molds.

Furthermore, by effect of the arrangement of the cam and tappet device on the lower end of the assembly, during the upward and downward movements of the shaft, the plunging end portion of the shaft itself generates significant variations of pressure and volume in the mentioned chamber in which the lubricating oil is present, thus inevitably triggering pumping phenomena, which leads to a gradual emptying of the chamber because the oil exits through the seal and, by moving up the shaft, enters into the pneumatic cylinder in some cases, and leaks outside the assembly in others.

In addition, the arrangement of the tappet element on the plunging free end of the shaft and the limited available space make it impossible to support the radial loads transmitted to the shaft by the tappet element itself by means of supporting bearings and/or bushings, so that the end part of the shaft always works in overhanging manner, with inevitable anomalous wear of the cam/tappet assembly.

SUMMARY OF THE INVENTION

It is the object of the present invention to make an actuating assembly of an operative member, which allows to solve the aforementioned problems simply and cost-effectively and which is in particular efficient, safe and compact.

According to the present invention, an actuating assembly for moving an operative member is made as defined in claim 1.

BRIEF DESCRIPTION OF THE DRAWINGS

The invention will now be described with reference to the accompanying drawings which illustrate a non-limitative embodiment thereof, in which.

DETAILED DESCRIPTION OF THE INVENTION

In FIG. 1, reference numeral 1 indicates a glassware forming machine, generally known as an I.S. machine, as a whole. The machine 1 comprises a mechanism box 2 (known) and a forming mold 3 (also known in itself and not described in detail) arranged over the box 2 and having an inlet 4 for a gob of glass.

The machine 1 further comprises operative members 5 (known in themselves), including a funnel 5' for inserting the gob of glass into the mold 3 through the inlet 4, a baffle 5" for closing the inlet 4 itself when the gob is inside the mold 3 and a blowing head 5''' for deforming the mass of glass accommodated in the mold.

In the machine 1, the operative members 5 are moved between a raised resting position distanced from the mold 3 and a lowered operative coupling position with the mold 3 itself by means of respective movement assemblies 6 independent from each other, only one of which is shown in FIG.

1 for the sake of clarity. The assemblies 6 are conceptually and functionally equal to each other.

Each assembly 6 comprises its own connecting frame or casing 8 to the box 2. The frame 8 extends in the box 2 through an upper wall 9 of the box 2 itself, which according to applications may comprise a shim plate 13 or not.

Each assembly 6 further comprises a supporting and actuating shaft 10, which is conveniently made in one piece, supports the respective operative member 5 (in manner known in itself), e.g. by means of a bracket 11, and is coupled to a respective fixed frame 8 to translate and rotate about a respective vertical axis 12 thereof.

With specific reference to FIG. 1, the frame 8 comprises an annular dead plate 18 which rests on the plate 13 and a tubular body 15, which extends under the plate 13 through openings in the plate 13 and in the wall 9 coaxially to the axis 12 and has an outer upper radial flange coupled to the wall 9 in absence of the plate 13, or to the plate 13 itself, as in the illustrated case.

The frame 8 then comprises a tubular guiding body 16 extending upwards from the body 15 beyond the plate 13 or the wall 9 in absence of the plate 13 and having a lower outer radial flange forced against the body 15 of the annular dead plate 18 which is coupled to the plate 13 or to the wall 9 by means of the fastening screws (not shown in the accompanying figures).

The shaft 10 comprises an intermediate portion 19 coupled to the guiding body 16 in rotational, axially sliding manner, and ends on the bottom with an end portion 20 coupled, again in rotational and axially sliding manner, to a further guiding body 22 blocked onto the body 15 in releasable manner.

The guiding body 22 closes the tubular body 15 on the bottom and delimits a chamber 24 with the body 15 itself (FIG. 1) housing a cam and tappet assembly 25 for rotating the shaft 10 about the axis 12 according to a motion profile (known in itself).

The assembly 25 comprises a fixed guiding cam 26 defined, in the specific case, by a groove obtained on an inner surface of the side wall of the body 15 and by a tappet element 27 defined by a roller orthogonal to the axis 12 and radially overhangingly protruding from the shaft 10 itself. The chamber 24 houses a lubricating liquid of the cam and tappet assembly 25.

Again with reference to FIG. 1, the end portion 20 comprises, in turn, a full upper stretch and a hollow lower end stretch 29.

The end stretch 29 defines a hollow rod of a pneumatic jack 30 for translating the shaft 10 along the axis 12 in opposite directions and to displace the operative member 5 between the mentioned resting and operating positions.

The jack 30 comprises a liner 31, one end portion of which surrounds and is stably connected to the guiding body 22 in fluid-tight manner and an opposite end portion of which is closed by a head 32, conveniently integral with the liner 31.

The guiding body 22, the liner 31 and the head 32 reciprocally delimit a chamber 33, in which a piston 34 of the jack 30 runs in fluid-tight manner integrally connected to a lower free end of the end stretch 29.

Figure 2:
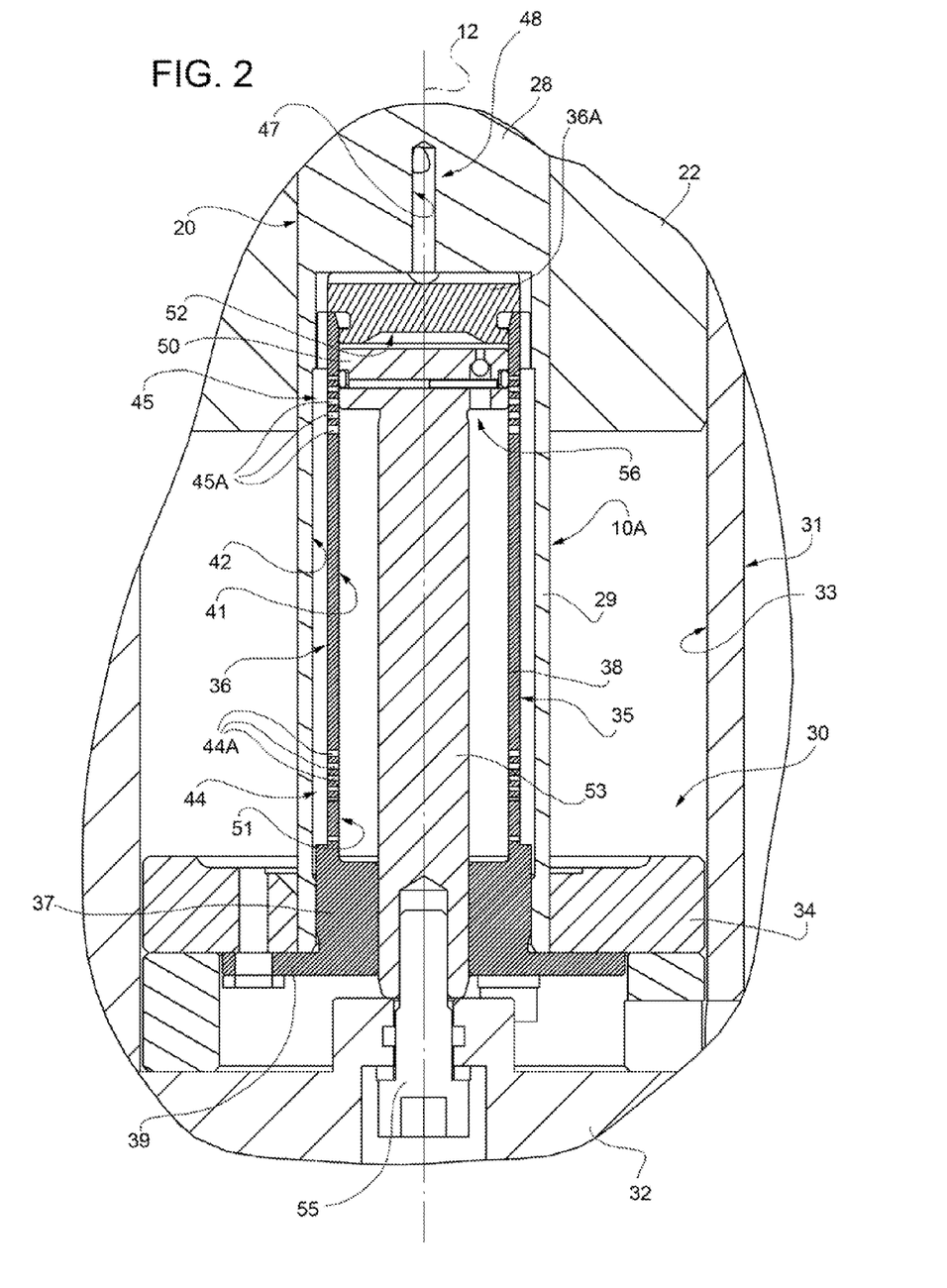
FIG. 2 shows a detail of FIG. 1 in section and on a highly enlarged scale; and the FIGS. 3 and 4 are similar to FIG. 2 and show the assembly in FIG. 1 in two different operative conditions.

Again with reference to FIG. 1, and in particular to FIG. 2, the end stretch or rod 29 fully houses a hydraulic damping or motion stabilizing cartridge 35 adapted to control the displacement of the shaft 10 and thus of the operative member 5.

With reference to FIG. 2, the hydraulic cartridge 35 comprises, in turn, a reversed cup-like body 36 and an upper fluid-tight closing plug 36A adjacent to the stretch 28. The cup-like body 36 comprises, in turn, a bottom wall 37 inserted in fluid-tight manner in a free end of the stretch 29 and a tubular inner portion 38 of the stretch 29 itself and coaxial to the axis 12. Conveniently, the bottom wall 37 has a radial flange 39 arranged abuttingly against a lower surface of the piston 34 and integrally connected to the piston 34 itself by means of screws.

The cup-shaped portion 36 delimits a cylindrical chamber 41 together with a plug 36A and an annular chamber 42 with stretches 28 and 29. The chamber 41 communicates with the annular chamber 42 through two series of calibrated holes, indicated by reference numerals 44 and 45. The series 44 of holes is arranged next to the bottom wall 37 and has a plurality of holes 44A extending orthogonally to the axis 12 and having decreasing diameters towards the wall 37.

On the other hand, the series 45 of holes is arranged next to the plug 36A and has a plurality of holes 45A extending orthogonally to the axis 12 and having decreasing diameters towards the ping 36A.

Again with reference to FIG. 2, the chamber 42 communicates with the chamber 24 through a duct 47 obtained within the stretch 28 of the shaft 10. Together with the chambers 24, 41, 42 and with the holes 44A and 45A, the duct 47 defines a closed hydraulic circuit 48, crossed by the lubricating liquid which, in the described assembly 6, performs the two-fold function of liquid lubricating the cam and tappet assembly 25 and of operative liquid controlling and stabilizing the motion of the shaft 10.

Again with reference to FIG. 2, the closed hydraulic circuit 48 extends completely within the casing 8 and with the exception of the chamber 24, entirely within a cylindrical surface 10A which, in the specific case, externally delimits both the rod 29 and the shaft 10.

Figure 3:
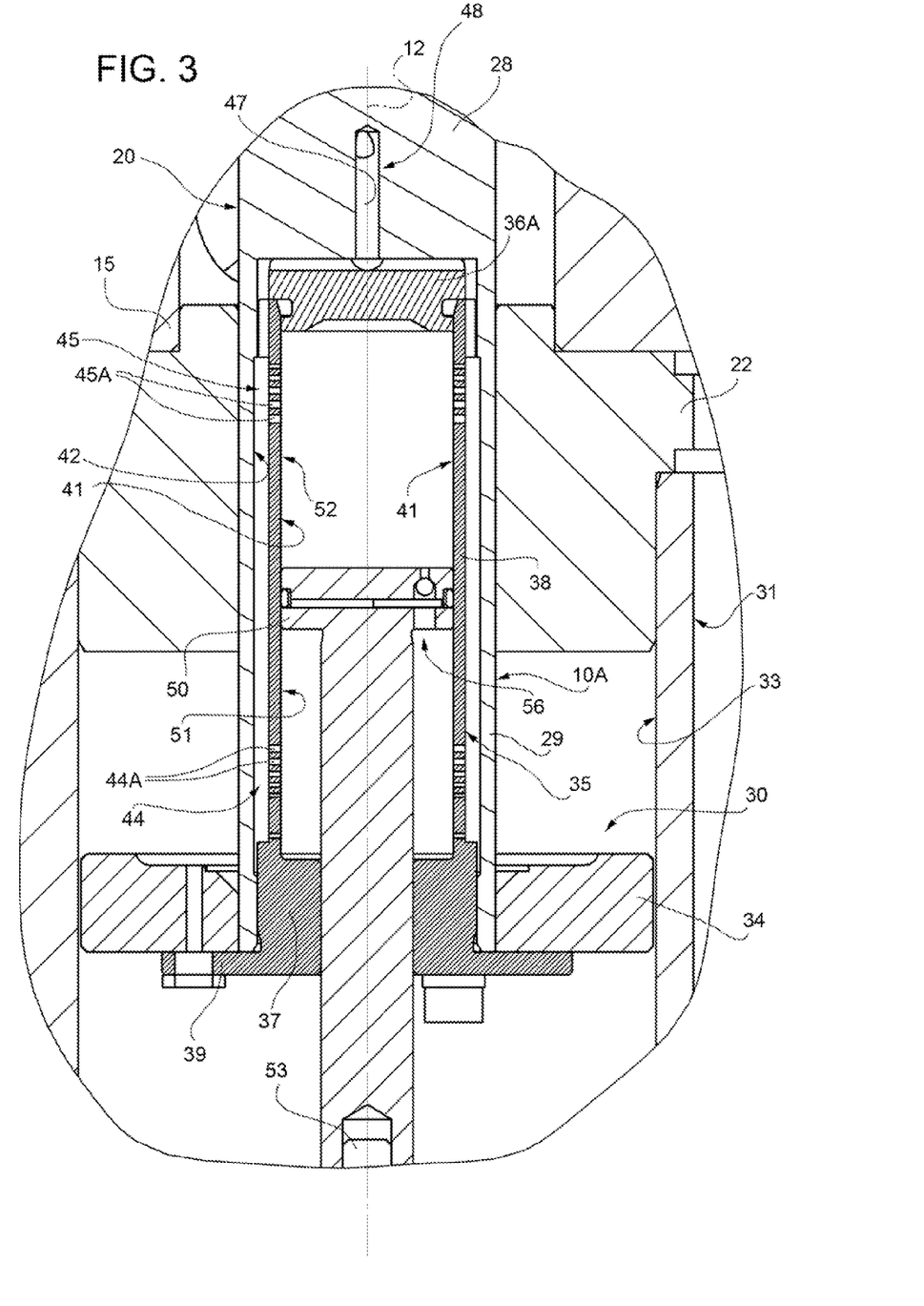
Figure 4:
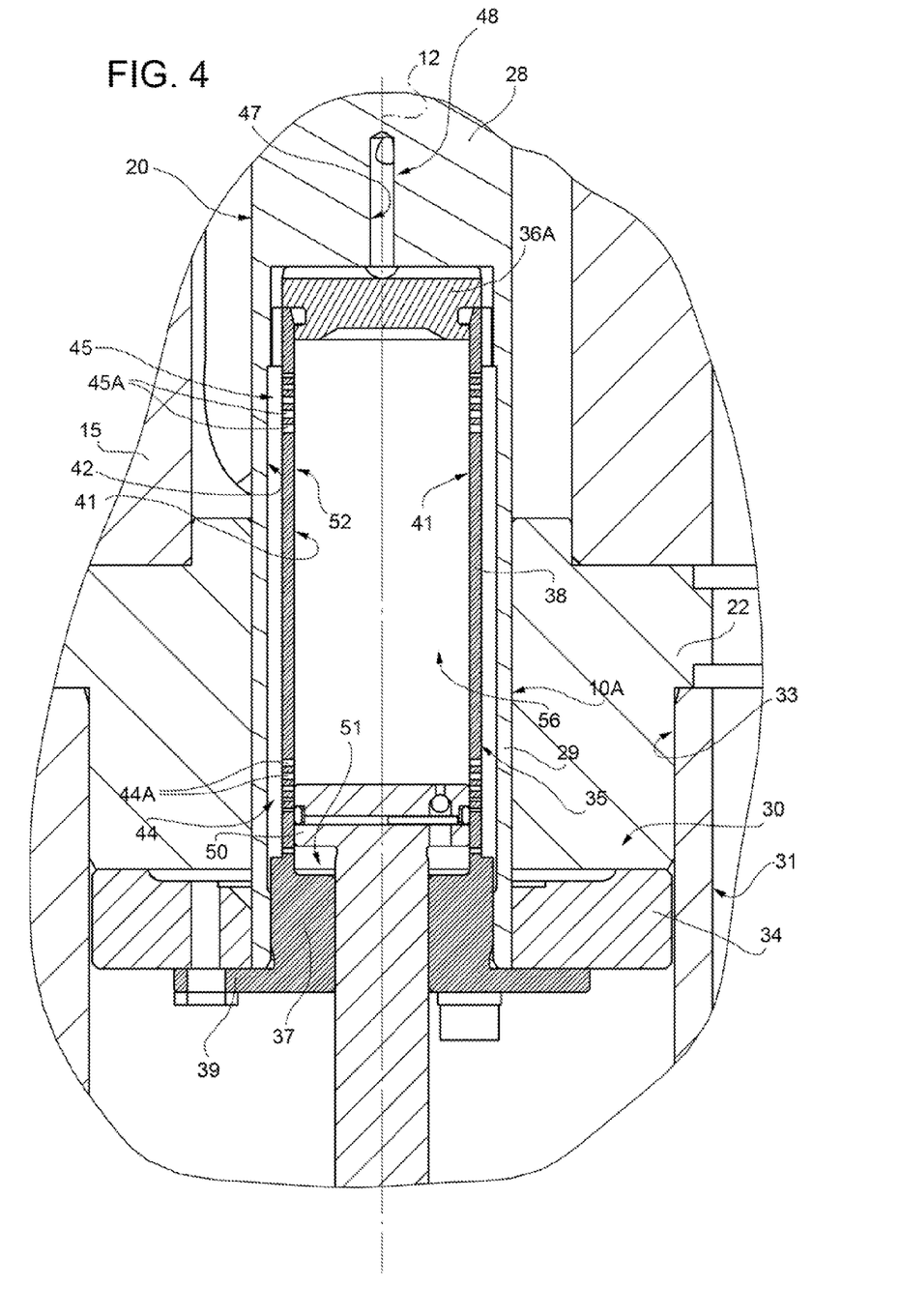

The hydraulic cartridge 35 finally comprises a piston 50, which runs in fluid-tight manner fluid inside the cylindrical chamber 41 and divides the chamber 41 itself into two variable-volume chambers, indicated by reference numerals 51 and 52 in FIG. 3. The piston 50 is integrally connected to an upper end of a rod 53 coaxial to axis 12 and has one opposite end stably connected to the bottom wall 32, conveniently by means of a screw 55.

The cartridge 35 finally comprises a ball check valve 56 conveniently obtained within the piston 50 and adapted to permit the free transit of the liquid from the chamber 52 towards the chamber 51 and to prevent the transit of the liquid itself from the chamber 51 towards the chamber 52.

In use, the jack 30 displaces the shaft 10 in opposite directions along the axis 12, the cam and tappet assembly 25 rotates the shaft 10 about the axis 12, while the hydraulic cartridge 35 controls the motion law of the shaft 10, and thus of the member 5, continuously (i.e. in each instant of the displacement) and independently from the direction of displacement. In other words, the hydraulic cartridge 35 controls the speed of the piston 34 both during the step of descending of the member 5 towards the mold 3 and during the step of distancing from the member 5 of the mold 3 itself thus preventing the generation of counter-pressures in the upper and lower chambers 30 of the pneumatic cylinder and preventing the member 5 from being subjected to sudden accelerations or decelerations, to vibrational states and/or end of travel shocks.

The above is consequent to the fact that the hydraulic cartridge 35 comprises two series 44 and 45 of holes crossed by the operative liquid and selectively and gradually closed by the piston 34 when the member 5 is arranged near the mentioned operative and resting positions, and in that the holes 44A and 45A of each series of holes 44 and 45 are calibrated holes of decreasing diameter towards the dead points. In this manner, the damping increases in the last stretches of both the downward and the upward movement by effect of the gradual decrease of the passage section of the operative liquid, while a nearly constant translation speed can be maintained in the remaining intermediate stretch, and in all cases precisely the translation speed defined during the step of designing regardless of the required motion law.

By avoiding slowing or stopping of the shaft 10 and the formation of vibrational states in any point of the displacement path, if is then possible to define movement profiles such to reduce the displacement times, and thus the cycle time, in both directions.

The arrangement of the cartridge 35 along displacement axis 12 of the shaft 10 and, in all cases, within the rod 29 of the pneumatic jack 31, which in practice constitutes an extension of the shaft 10 itself, allows, on one hand, to make an actuation assembly which is extremely compact and thus suited to be used on any type of machine and which can replace the traditional actuation devices already operating on the known machines and, on the other hand, allows to make an actuating assembly in which the hydraulic damping device is protected from external elements and from thermal emissions. The coaxiality between cartridge 35 and axis 12 then prevents the transmission of bending moments of the piston 34, which may thus be made lighter because it is less biased, or only axially biased.

In addition to this, the arrangement of the cartridge 35 on the lower axial end or the assembly 1 considerably facilitates the normal maintenance and/or replacement operations of the cartridge 35 itself, which may be performed simply by axially pulling out/inserting the cartridge 35 on the rod 29.

On the other hand, the fact that the damping cartridge 35 is arranged under the cam and tappet assembly 25 allows to feed the cartridge 35 using the same lubricating oil as the cam and tappet assembly 25 instead of a dedicated liquid. Thus, in practice, the operative liquid provided in the known solutions to feed the damping device is eliminated and replaced by a closed circuit completely housed in the casing, with evident advantages in terms of construction and maintenance costs, and of safety for machine operators. In parallel, the speed control of the operative member in both directions is considerably improved because the described cartridge 35 is a hydraulic damping which works with nearly linear damping law.

Then, the fact that the operative/lubricating liquid circulates in a closed circuit of limited extension allows to reduce the mass of circulating liquid and to protect the circulating liquid itself from sources of heat present aboard the machine and from fire risks without needing to make dedicated thermal harriers or complex conveying circuits.

In addition to this, in the described assembly 6, the entire operative/lubricating liquid mass is placed inside the box 2, i.e. away from the mold 3, in which the ventilated cooling air of the machine and of the mold itself is present, which thus cooperates also for the cooling of the assembly 6.

Besides, the fact of supporting the intermediate part 19 to which the tappet element 27 is coupled by means of a pair of guides obtained in the bodies 16 and 22 and arranged on axial opposite parts of the tappet element 27 drastically reduces the entity of the deformations suffered by the shaft by one order of size. Indeed, unlike the known solutions, the shaft no long works overhangingly but is guided on both ends thus making the running of the tappet element 27 on the cam 26 smooth and stable. This translates into an increase of the operative life of the assembly 25 by effect of the lesser wear of the relatively moving parts and a considerable reduction of the vibrations on the described group 6, and consequently on the operative member 5.

Finally, since the section of the portion 19 which crosses the chamber 24 is constant, the volume of the oil present in the chamber 24 itself remains constant during the translation of the shaft 10. Indeed, with respect to the known solutions, in which the shaft is plunging, the constant section avoids overpressure or vacuum in the chamber 24, in which the operative/lubricating liquid is always ensured. From the above, it is apparent that changes and variants may be made to the described assembly 6.

In particular, the series of holes, the geometry features and sizes of the holes 44A and 45A and their arrangement along axis 12 may also be different from those described by way of example. In particular, one of two series 44 and 45 of described holes may be provided. Furthermore, the cartridge 35 could always be housed in the shaft 10 or in the roil 23 of the piston but in eccentric position with respect to the axis 12, and the rod 29 could not be defined by the extension of the shaft 10 but, for example, by a distinct portion connected to the shaft in coaxial position with respect to the axis 12 or not.

Furthermore, the common hydraulic circuit 4B could be made in different manner from that indicated and may use at least one duct or a stretch of pipes external to the shaft 10.

Finally, the cam and tappet assembly may be constructively different from that described.

The invention claimed is:

1. An actuating assembly for moving an operative member of a glassware forming machine, the assembly comprising a connecting casing adapted to be fixed to a supporting structure of the machine; a shaft supporting the operative member and coupled to said connecting casing so as to translate and rotate about a fixed axis thereof; a pneumatic jack for displacing said shaft along said axis and comprising a rod connected to said shaft and a piston; a cam and tappet device for rotating the shaft in opposite directions about said axis; the device comprising a chamber and a cam and tappet assembly housed in said chamber and lubricated by a lubricating fluid present in said chamber; and hydraulic means for stabilizing the motion of said supporting shaft and comprising an operative fluid; characterized in that said chamber and said stabilization hydraulic means define part of a single closed hydraulic circuit for flowing a lubricating and operative fluid which is in common to said cam and tappet device and to said stabilization hydraulic means.

2. An assembly according to claim 1, characterized in that said closed hydraulic circuit is completely housed in said connecting casing.

3. An assembly according to claim 1, characterized in that said closed hydraulic circuit is completely housed in a box of said machine.

4. An assembly according to claim 1, characterized in that said cam and tappet device is arranged along said shaft between a connecting point of said pneumatic jack and a point connecting said operative member to said shaft.

5. An assembly according to claim 1, characterized in that said closed hydraulic circuit comprises a single conduit connecting said chamber to said hydraulic stabilization means.

6. An assembly according to claim 5, characterized in that said conduit fully extends within said shaft.

7. An assembly according to claim 1, characterized in that said cam and tappet device comprises a cam fixed to said tubular connecting body and a tappet element carried by an intermediate portion of said shaft; first and second guiding means of said shaft being arranged along said axis on opposite axial sides of said tappet element for guiding said intermediate portion.

8. An assembly according to claim 7, characterized in that said shaft has a constant section between said first and second guiding means.

9. An assembly according to claim 1, characterized in that said stabilization hydraulic means are housed in said pneumatic jack.

10. An assembly according to claim 1, characterized in that said stabilization hydraulic means are housed in a hollow portion of said shaft.

11. An assembly according to claim 10, characterized in that said stabilization hydraulic means include a hydraulic damping cartridge, in turn comprising a closing head fluid-tightly connected to said hollow portion; a liner fluid-tightly connected to said closing head and delimiting an annular first chamber, together with said hollow portion, and a second chamber, together with the closing head, both said first and second chambers accommodating said lubricating and operative fluid; and a piston, which is fixed with respect to said connecting frame and is movable with respect to said liner in said second chamber; said fixed piston splitting said second chamber into two variable-volume chambers; said liner comprising calibrated through holes putting into communication said first chamber with at least one of said variable-volume chambers and closable by said piston during the displacement of said shaft; said chambers and said calibrated holes constituting part of said closed hydraulic circuit.

12. An assembly according to claim 10, characterized in that said hollow portion has an axial opening for inserting/extracting said cartridge.

* * * * *